United States Patent
Goto et al.

(10) Patent No.: US 7,733,045 B2
(45) Date of Patent: Jun. 8, 2010

(54) MOTOR DRIVING CIRCUIT

(75) Inventors: Tomoyuki Goto, Kumagaya (JP); Koichiro Ogino, Ota (JP); Tetsuya Yoshitomi, Ora-gun (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 368 days.

(21) Appl. No.: 11/754,513

(22) Filed: May 29, 2007

(65) Prior Publication Data

US 2007/0274692 A1 Nov. 29, 2007

(51) Int. Cl.
*H02P 27/00* (2006.01)

(52) U.S. Cl. ............................. 318/400.3; 318/400.01; 318/700; 388/800

(58) Field of Classification Search .............. 318/400.3, 318/400.01, 700; 388/800
See application file for complete search history.

(56) References Cited

U.S. PATENT DOCUMENTS

| | | | | |
|---|---|---|---|---|
| 6,020,700 | A * | 2/2000 | Tien | 318/400.38 |
| 6,291,950 | B1 * | 9/2001 | Jeong | 318/400.01 |
| 6,822,419 | B2 * | 11/2004 | Horng et al. | 318/825 |
| 6,922,029 | B2 * | 7/2005 | Fuse | 318/400.11 |
| 7,002,308 | B2 | 2/2006 | Kinukawa et al. | |
| 2004/0075407 | A1 * | 4/2004 | Ohiwa et al. | 318/254 |

FOREIGN PATENT DOCUMENTS

| | | |
|---|---|---|
| JP | 05-030780 | 5/1993 |
| KR | 10-2004-0111098 | 12/2004 |

OTHER PUBLICATIONS

Korean Office Action, dated Sep. 29, 2008 (with partial English translation).

* cited by examiner

*Primary Examiner*—Walter Benson
*Assistant Examiner*—David S Luo
(74) *Attorney, Agent, or Firm*—Watchstone P&D, PLLC

(57) ABSTRACT

According to some preferred embodiments of the present invention, a motor driving circuit includes a phase detection circuit configured to detect a rotation phase of a motor and output a phase detection signal, a first amplifier configured to amplify the phase detection signal and output an amplified detection signal, and a second amplifier configured to amplify the amplified detection signal in accordance with a power supply voltage and output a driving signal to the motor. The motor driving circuit is further provided with a controlling circuit configured to detect the power supply voltage and increase/decrease amplitude of the amplified detection signal outputted from the first amplifier in response to an increase/decrease of the detected power supply voltage, whereby heat generation and noise generation can be restrained, irrespective of the increase/decrease of the power supply voltage.

9 Claims, 6 Drawing Sheets

MOTOR DRIVING CIRCUIT

This application claims priority under 35 U.S.C. §119 to Japanese Patent Application No. 2006-148409 filed on Mar. 29, 2006, and No. 2006-148411 filed on Mar. 29, 2006, the entire disclosure of which are incorporated herein by reference in their entireties.

BACKGROUND OF THE INVENTION

1. Field of the Invention

The present invention relates to a motor driving circuit. More specifically, some preferred embodiment relate to a driving circuit for a linear driving type motor preferably for use in a personal computer.

2. Description of the Related Art

The following description sets forth the inventor's knowledge of related art and problems therein and should not be construed as an admission of knowledge in the prior art.

FIG. 5 shows an example of a conventional motor driving circuit. In this example, the motor 1 is a single-phase brushless motor equipped with a coil 2. This driving circuit includes a hall element 3, a hall amplifier 4, and an output amplifier 5. The motor 1 rotates in accordance with the driving signal S1 applied to the coil 2. The hall element 3 is configured to detect the rotating phase of the motor 1 and output the detection signal S2. The hall amplifier 4 is configured to amplify the detection signal S2 and output an amplified detection signal S3. The output amplifier 5 is configured to amplify the amplified detection signal S3 in accordance with a power source voltage V1 and output the driving signal S1. Thus, the motor 1, the hall element 3, the hall amplifier 4, and the output amplifier 5 form a feedback loop to linearly drive the motor 1.

In this motor driving circuit the revolving speed of the motor 1 varies depending on the power supply voltage V1. That is, the revolting speed of the motor 1 increases when the power supply voltage V1 is increased and decreases when the power supply voltage V1 is decreased.

In the aforementioned conventional motor driving circuit, even if the power supply voltage V1 is changed, the amplitude of the driving signal S1 is kept constant. The relationship between the power supply voltage V1 and the amplitude of the driving signal S1 is shown in FIGS. 6A to 6C.

FIG. 6A shows the waveform of the driving signal S1 in the case where the amplitude of the driving signal S1 is appropriate with respect to the power supply voltage V1. In general, the driving signal S1 is designed such that the apex of the waveform of the driving signal S1 is slightly distorted (saturated) by the power supply voltage V1.

FIG. 6B shows the waveform of the driving signal S1 in the case where the power supply voltage V1 is set higher than that in FIG. 6A in order to increase the revolving speed of the motor 1. As mentioned above, even if the power supply voltage V1 is changed, the amplitude of the driving signal S1 is kept unchanged. In this case, since the driving signal S1 is lower than the power supply voltage V1, the motor 1 cannot reach the set revolving speed due to the insufficient driving force. Furthermore, in the output amplifier 5, heat corresponding to the voltage difference between the power supply voltage V1 and the driving signal S1 will be generated, which requires heat releasing countermeasures.

FIG. 6C shows the waveform of the driving signal S1 in the case where the power supply voltage V1 is set lower than that in FIG. 6A in order to decrease the revolving speed of the motor 1. In this case, the apex of the waveform of the driving signal S1 is significantly distorted (saturated) at the region exceeding the power supply voltage V1 into an approximately rectangular waveform. As a result, the driving signal S1 changes rapidly, which in turn causes generation of noise.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a motor driving circuit capable of controlling a revolving speed of a motor by changing a power supply voltage while suppressing heat generation and noise generation.

According to some preferred embodiments of the present invention, in addition to a phase detection circuit configured to detect a rotation phase of a motor and output a phase detection signal, a first amplifier configured to amplify the phase detection signal and output an amplified detection signal, and a second amplifier configured to amplify the amplified detection signal in accordance with a power supply voltage and output a driving signal to the motor, a controlling circuit is provided. This controlling circuit is configured to detect the power supply voltage and increase/decrease amplitude of the amplified detection signal outputted from the first amplifier in response to an increase/decrease of the detected power supply voltage. With this motor controlling circuit, the driving signal is amplified in response to the increase/decrease of the power supply voltage. As a result, heat generation and noise generation due to the saturation (distortion) of the driving signal by the power supply voltage can be restrained, irrespectively of the adjustment of the power supply voltage for changing the revolution speed of the motor.

The controlling of the amplitude of the amplified detection signal can be performed by adjusting the gain of the detection circuit or that of the first amplifier.

It is preferable to adjust the amplification of the driving signal so as to keep a ratio of a saturation time of the driving signal and a non-saturation time of the driving signal constant or approximately constant, irrespective of an increase/decrease of the power supply voltage. The saturation time and the non-saturation time are defined, respectively, as a saturation time of an apex of a waveform of the driving signal and a non-saturation time thereof in a case where a balance of heat generation and noise generation due to the saturation of the apex of the waveform of the driving signal is set to optimum.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the present invention will be described by way of example and not limitation. It should be understood based on this disclosure that various other modifications can be made by those in the art based on these illustrated embodiments.

Figure 1:
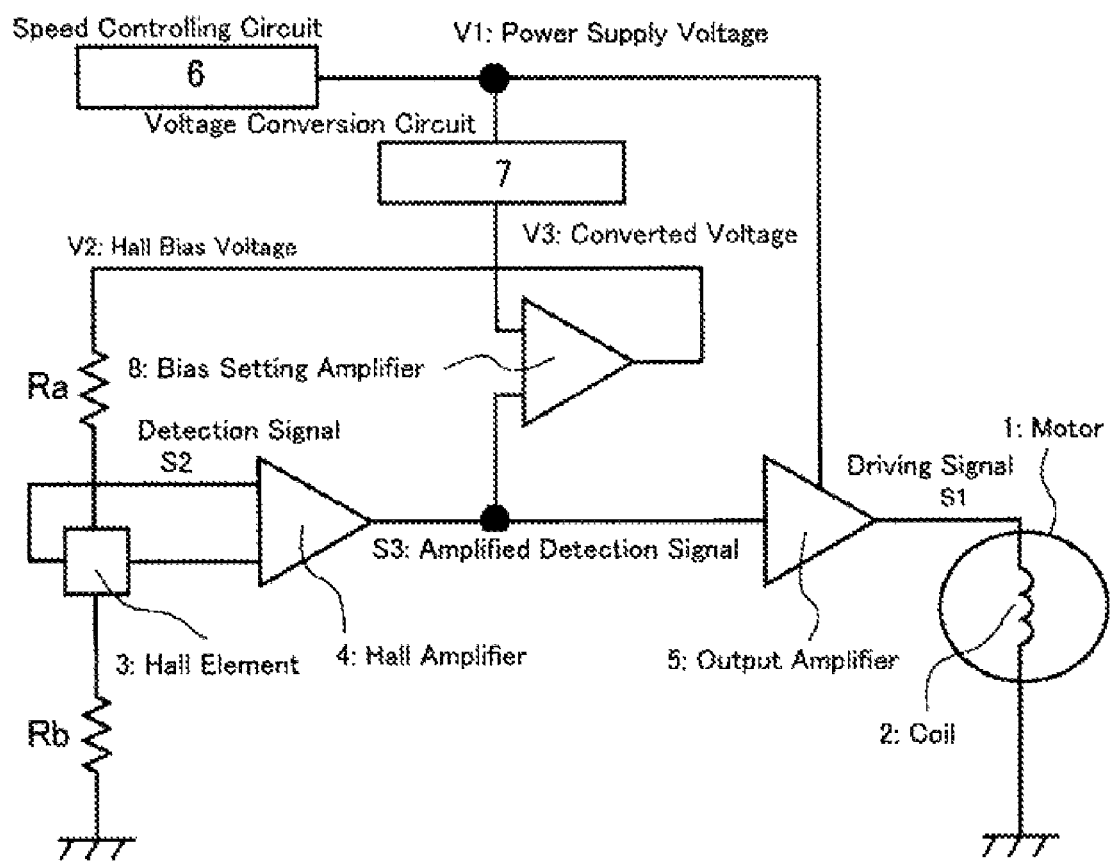
FIG. 1 is a schematic circuit diagram of a motor driving circuit according to a first embodiment of the present invention.

FIG. 1 shows a motor driving circuit according to a first embodiment of the present invention. In this circuit a motor 1, a hall element 3, a hall amplifier (first amplifier) 4, and an output amplifier (second amplifier) 5 form a feedback loop to linearly drive the motor 1. The revolving speed of the motor 1 is controlled in accordance with the power supply voltage V1 applied to the output amplifier 5. The power supply voltage V1 is adjusted to the value corresponding to the set revolving speed and outputted. The power supply voltage V1 is converted into a hall bias voltage V2 to be applied to the hall element 3 via a voltage conversion circuit 7 and a bias setting amplifier (third amplifier) 8. Hereinafter, the motor driving circuit will be detailed.

The motor 1 is a single-phase brushless motor equipped with a coil 2. This motor 1 is provided with a rotor magnet attached to the rotor which rotates depending on the driving signal S1 applied to the coil 2.

The hall element 3 is disposed at a position where the rotor magnet of the motor 1 passes to detect the rotating phase of the motor 1 and output the detection signal S2. In detail, the hall element 3 has two terminals. In order to pass a constant current through the hall element 3, a certain hall bias voltage V2 is applied to the one of the terminals via a first bias resistor Ra. On the other hand, the other terminal is grounded via a second bias resistor Rb. The hall element 3 outputs a detection signal S2 which is a sine-wave voltage from each of the two output terminals in opposite phase. The hall element 3 is made of, e.g., gallium arsenic (GaAs), or indium antimony (InSb). The amplitude of the detection signal S2 depends on the hall bias voltage V2 applied to the first bias resistor Ra. In this motor driving circuit of this embodiment, as will be explained later, the hall bias voltage V2 changes depending on the power supply voltage V1 which will be set in accordance with the target revolution speed of the motor 1. That is, the amplitude of the detection signal S2 can be changed depending on the change of the power supply voltage V1.

The hall amplifier 4 is configured to amplify the detection signal S2 and output an amplified detection signal S3. That is, to the non-inverting input of the hall amplifier 4, an output of the hall element 3 is inputted. On the other hand, to the inverting input of the hall amplifier 4, an inverted output of the hall element 3 is inputted. From the hall amplifier 4, a sine-wave amplified detection signal S3 amplified in the amplitude of the detection signal S2 will be outputted.

The output amplifier 5 is configured to amplify the amplified detection signal S3 in accordance with the applied power supply voltage V1 and output the driving signal S1. That is, the value of the power supply voltage V1 is in proportion to the amplification degree of the detection signal S2. In detail, when the voltage of the amplified detection signal S3 exceeds the range of the power supply voltage V1, the driving signal S1 outputted from the output amplifier 5 will be distorted (saturated) into an approximately rectangular shape in the range exceeding the power supply voltage V1.

The power supply voltage V1 is set by the speed controlling circuit 6 depending on the target revolving speed of the motor 1. Concretely, in cases where the revolving speed of the motor 1 is set higher than a reference revolving speed, the power supply voltage V1 is set higher. On the other hand, in cases where the revolving speed of the motor 1 is set slower than the reference revolving speed, the power supply voltage V1 is set lower.

In the motor driving circuit, the power supply voltage V1 is also applied to the voltage conversion circuit 7. With this voltage conversion circuit 7, the power supply voltage V1 is converted into a converted voltage V3 depending on the power supply voltage V1 and then inputted into the bias setting amplifier 8. Also inputted into the bias setting amplifier 8 is the amplified detection signal S3 outputted from the hall amplifier 4. The bias conversion amplifier 8 compares the converted voltage V3 with the amplified detection signal S3 and outputs the hall bias voltage V2.

That is, in this motor driving circuit, the hall bias voltage V2 changes depending on the set power supply voltage V1. Accordingly, the gain of the detection signal S2 changes depending on the power supply voltage V1, which in turn changes the amplitude of the amplified detection signal S3 and that of the driving signal S1.

Figure 2A:
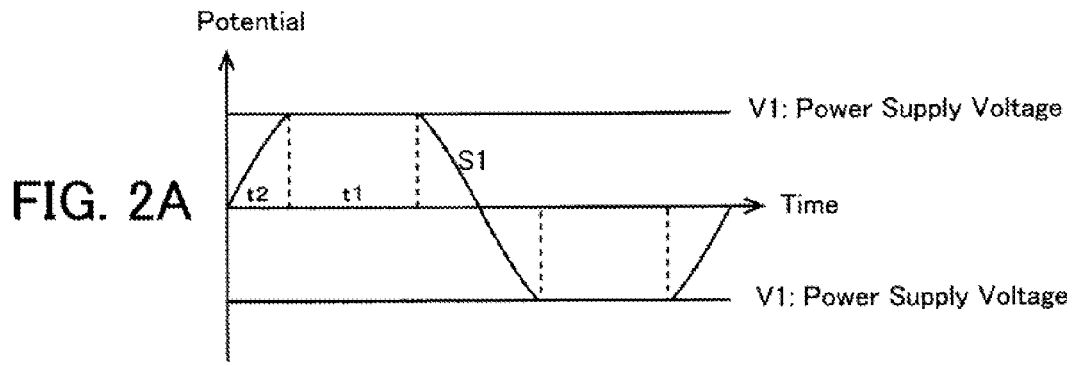
FIG. 2A show a waveform of a driving signal of the motor driving circuit shown in FIG. 1 in the case where the amplitude of the driving signal S1 is appropriate with respect to the power supply voltage V1.
Figure 2B:
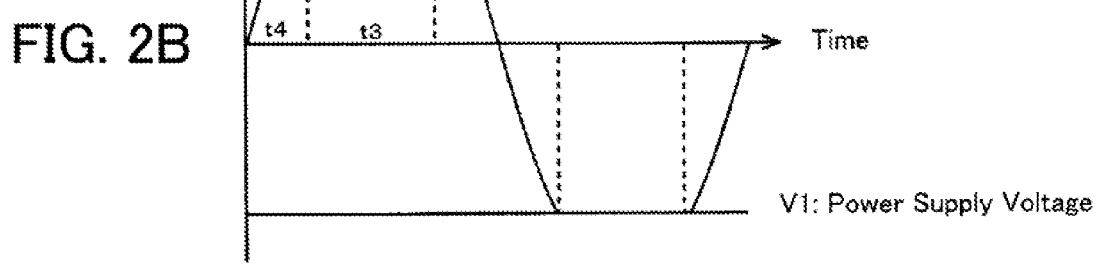
FIG. 2B shows a waveform of a driving signal of the motor driving circuit shown in FIG. 1 in the case where the power supply voltage V1 is set higher than that in FIG. 1 in order to increase the revolving speed of the motor.
Figure 2C:
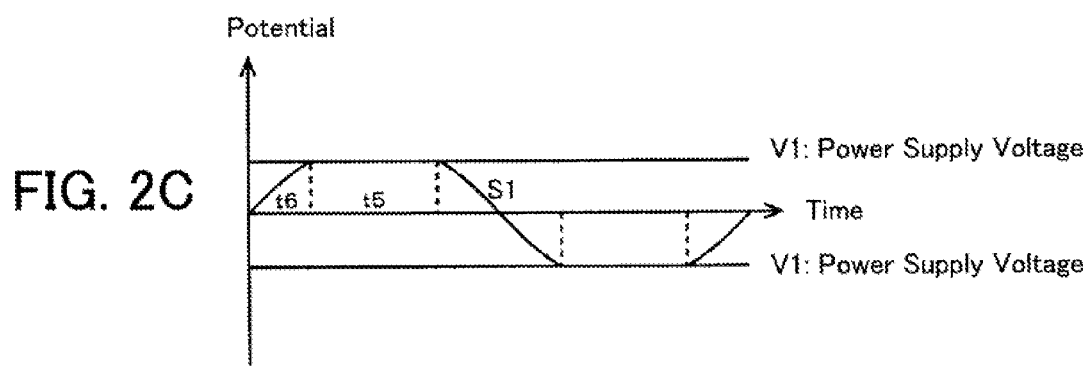
FIG. 2C shows a waveform of a driving signal of the motor driving circuit shown in FIG. 1 in the case where the power supply voltage V1 is set lower than that in FIG. 1 in order to decrease the revolving speed of the motor.

FIGS. 2A to 2C each shows a waveform of the driving signal S1 outputted from the output amplifier 5.

FIG. 2A shows a waveform of the driving signal S1 in the case where the amplitude of the driving signal S1 is appropriate with respect to the power supply voltage V1. In general, the driving signal S1 is designed so that the apex of the waveform of the driving signal S1 is slightly distorted (saturated) by the power supply voltage V1. When the power supply voltage V1 is larger than the driving signal S1, heat depending on the voltage potential difference between the power supply voltage V1 and the driving signal S1 will be generated. On the other hand, when the power supply voltage V1 is smaller than the driving signal S1, the apex of the waveform of the driving signal S1 will be distorted (saturated) in the range exceeding the power supply voltage V1, resulting in a sudden change of the driving signal S1, which in turn causes generation of noise. Now, the heat generation requires heat releasing countermeasures and therefore the heat generation problem should be solved in preference to noise problem. Under the circumstances, focusing on the minimization of the heat generation, the power supply voltage V1 is designed so as to be slightly smaller than the driving signal S1 so that the balance between the heat generation and the noise generation become optimum. In this document, in the state where the optimum balance is maintained, the saturation time of the driving signal S1 will be defined as "t1" in FIG. 2A and the non-saturation time thereof will be defined as "t2" in FIG. 2.

FIG. 2B show a waveform of the driving signal S1 in the case where the power voltage V1 is set larger than that in FIG. 2A so as to increase the revolving speed of the motor 1. As mentioned above, in the driving circuit, the hall bias voltage V2 is amplified when the power supply voltage V1 is raised. In this case, the amplitude of the detection signal S2 also increases in accordance with the increase of the power supply voltage V1. Accordingly, the amplitude of the amplified detection signal S3 and that of the driving signal S1 dependent on the detection signal S2 also increase in accordance with the increase of the power supply voltage V1. It is preferable that the apex of the waveform of the driving signal S1 is saturated by the power supply voltage V1 at a predetermined constant rate, irrespective of an increase/decrease of the power supply voltage V1. Concretely the hall bias voltage V2 is set so that the ratio of the saturation time t3 of the driving signal S1 and the non-saturation time t4 of the driving signal S1 becomes equal to the ratio of the t1 and t2 in FIG. 1A. The change of the hall bias voltage V2 depending on the power supply voltage V1 is adjusted by the voltage conversion circuit 7. In this case, the balance between the noise generation and the heat generation depending on each power supply voltage V1 can be kept optimum.

FIG. 2C shows a waveform of the driving signal S1 in the case where the power supply voltage V1 is set smaller than that in FIG. 2A so as to decrease the revolving speed of the motor 1. The hall bias voltage V2 decreases depending on the decrease of the power supply voltage V1. In this case, the amplitude of the detection signal S2 decreases in accordance with the decrease of the power supply voltage V1. Accordingly, the amplitude of the amplified detection signal S3 and that of the driving signal S1 dependent on the detection signal S2 also decrease in accordance with the decrease of the power supply voltage V1. In the same manner as in the case shown in FIG. 2A, it is preferably set the hall bias voltage V2 so that the ratio of the saturation time t5 of the driving signal S1 and the non-saturation time t6 becomes equal to the ratio of the t1 and t2 in FIG. 2A. The change of the hall bias voltage V2 depending on the power supply voltage V1 is also adjusted by the voltage conversion circuit 7. In this case too, the balance between the noise generation and the heat generation depending on each power supply voltage V1 can be kept optimum.

Figure 3:
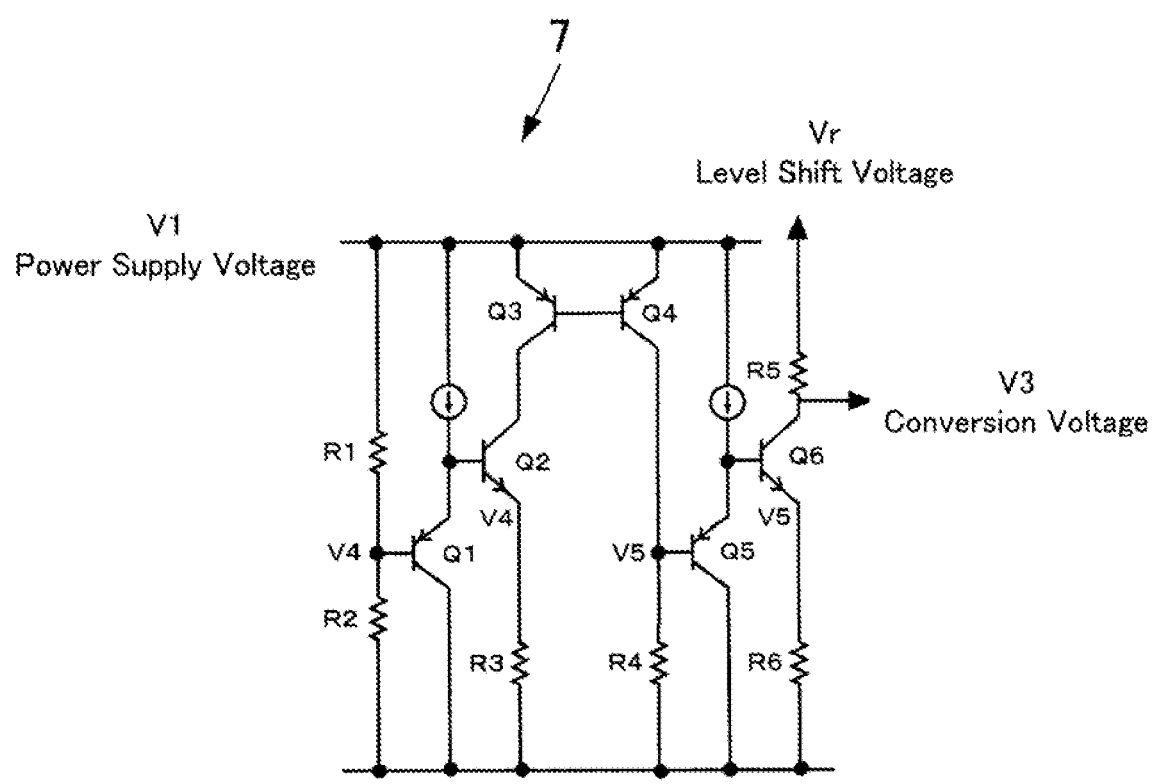
FIG. 3 is a circuit diagram of a voltage conversion circuit shown in FIG. 1.

FIG. 3 shows an example of the voltage conversion circuit 7. This voltage conversion circuit 7 is configured to convert the power supply voltage V1 into a converted voltage V3 by which the ratio of the saturation time and the non-saturation time becomes constant. Hereinafter, this circuit 7 will be detailed.

At the base of the transistor Q1, a voltage V4 set by dividing the power supply voltage V1 by the resistor R1 and the resistor R2 is generated. Here, the transistor Q1 and the transistor Q2 have the same base-emitter voltage. Thus, at the emitter of the transistor Q4, approximately the same voltage V4 is generated. A transistor Q3 and the transistor Q4 constitute a mirror circuit. Thus, at the collector of the transistor Q4, a voltage V5 set by the mirror ratio of the transistor Q3 and the transistor Q4 and the resistance ratio of the resistor R3 and the resistor R4 will be generated. A transistor Q5 and a transistor Q6 have the same base-emitter voltage. Thus, at the emitter of the transistor Q6, approximately the same voltage V5 is also generated. To the resister R5, an arbitrarily settable level shift voltage Vr is applied. Therefore, from the output portion of the voltage conversion circuit 7, the power supply voltage V1 is converted by the level shift voltage Vr into the converted voltage V3 as an output. That is, the converted voltage V3 changes in accordance with the power supply voltage V1. Furthermore, the converted voltage V3 is adjusted so as to meet the aforementioned ratio of the saturation time of the driving signal S1 and the non-saturation time thereof by the level shift voltage Vr.

As explained above, in the motor driving circuit, when the power supply voltage V1 is changed, the amplitude of the driving signal S1 changes so as to keep the ratio of the saturation time of the driving signal S1 and the non-saturation time thereof constant. Accordingly, even if the revolving speed of the motor is changed, heat generation and noise generation can be suppressed.

In the aforementioned embodiment, although the amplitude of the driving signal S1 is changed by adjusting the hall bias voltage V2 in accordance with the changing of the power supply voltage V1 so as to keep the ratio of the saturation time of the driving signal S1 and the non-saturation time thereof constant, it can be constituted to change the amplitude of the driving signal S1 by another method.

Figure 4:
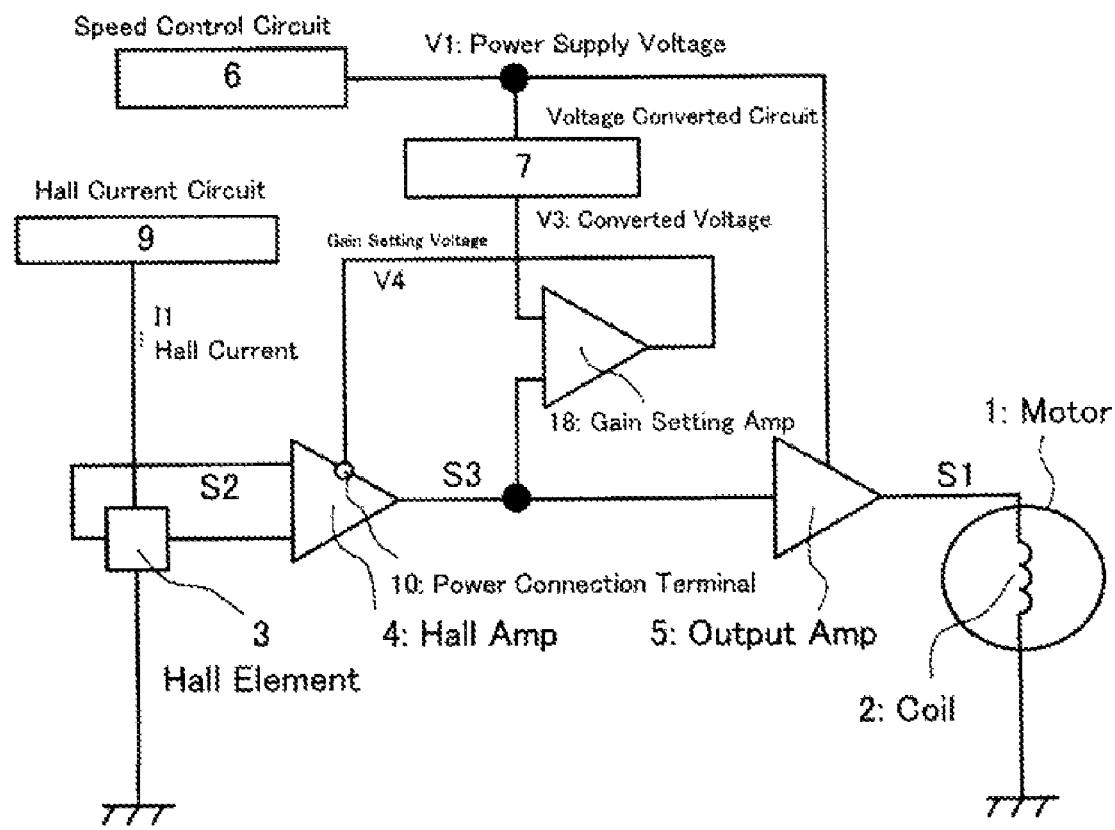
FIG. 4 is a schematic circuit diagram of a motor driving circuit according to a second embodiment of the present invention.
Figure 5:
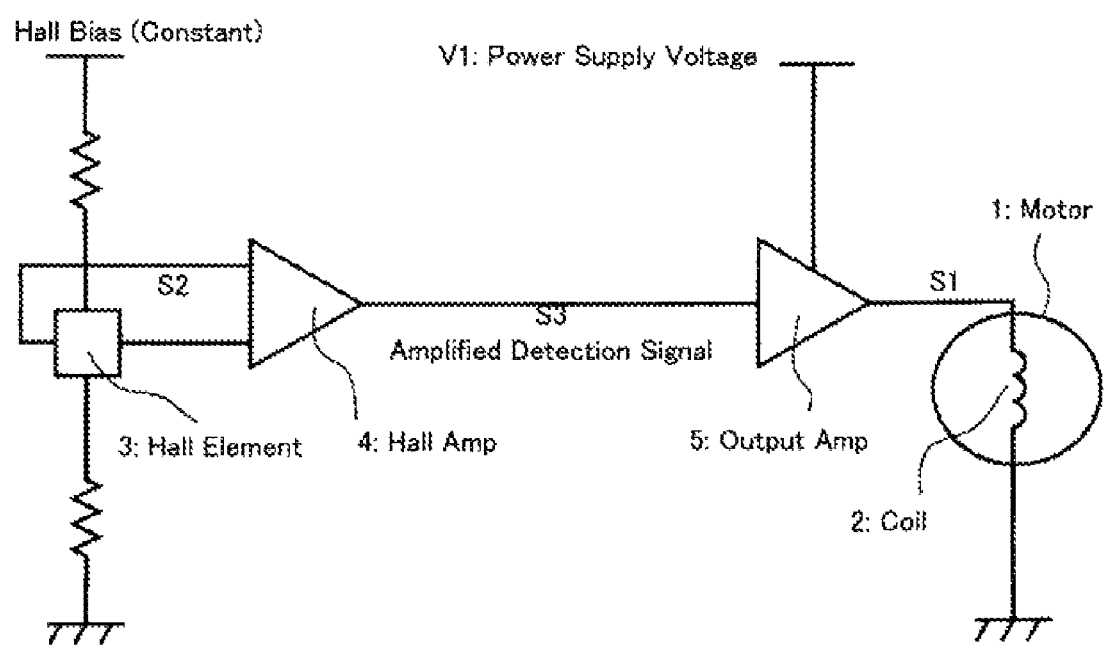
FIG. 5 is a schematic circuit diagram of a conventional motor driving circuit.
Figure 6A:
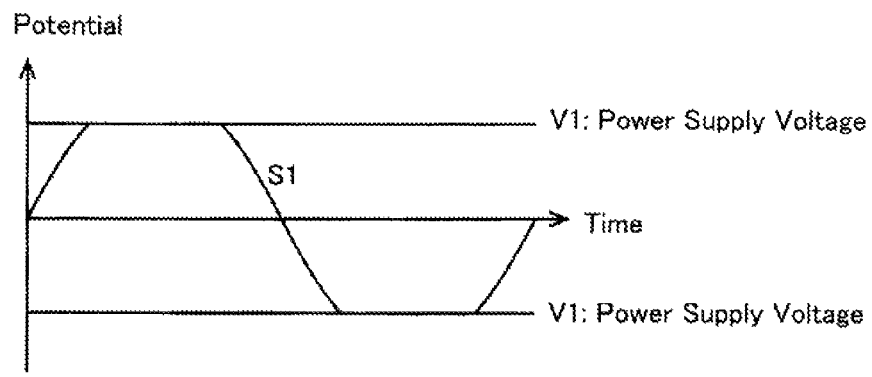
FIG. 6A shows a waveform of a driving signal of the conventional motor driving circuit shown in FIG. 5 in the case where the amplitude of the driving signal S1 is appropriate with respect to the power supply voltage V1.
Figure 6B:
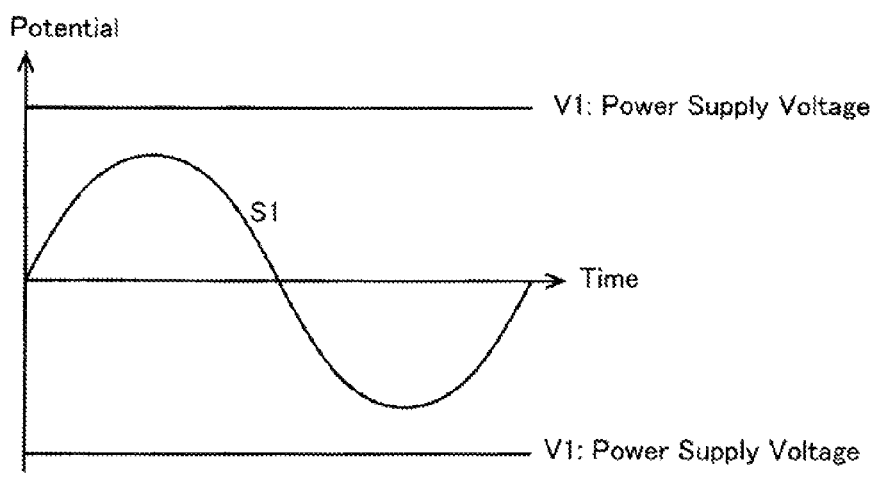
FIG. 6B shows a waveform of a driving signal of the conventional motor driving circuit shown in FIG. 5 in the case where the power supply voltage V1 is set higher than that in FIG. 6A in order to increase the revolving speed of the motor.
Figure 6C:
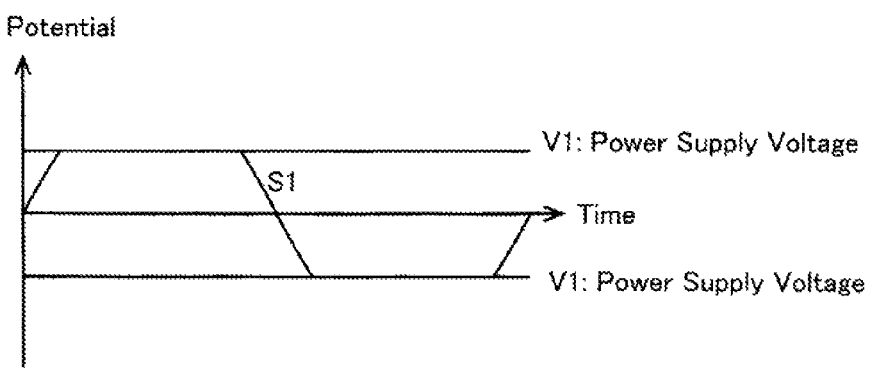
FIG. 6C shows a waveform of a driving signal of the conventional motor driving circuit shown in FIG. 5 in the case where the power supply voltage V1 is set lower than that in FIG. 6A in order to decrease the revolving speed of the motor.

FIG. 4 shows a motor driving circuit according to a second embodiment of the present invention. In this embodiment, it is configured such that the hall current I1 passing through the hall element 3 would not change in accordance with the change of the power supply voltage V1. The hall current I1 is controlled so as not to drop below a predetermined amount. The internal resistance of the hall element 3 differs every element and changes in accordance with temperature. For example, if the internal resistance becomes higher than a design value, the hall current I1 drops below the predetermined value. This causes insufficient detection of the magnetic fields based on the revolution of the motor 1. On the other hand, if the internal resistance drops below the design value, the hall current I1 increases beyond the predetermined value, resulting in a breakage of the hall element 3 by the heat generation. Accordingly, in the motor driving circuit according to this embodiment, the hall current circuit 9 is provided to output an appropriate hall current I1 in accordance with the internal resistance of the hall element 3. This hall element circuit 9 is constituted by, e.g., a constant-voltage output circuit which outputs a constant hall bias voltage and a clip circuit which clips the output current from the constant-voltage output circuit at a predetermined level.

Furthermore, in this embodiment, the power supply voltage V1 is applied to the power connection terminal of the hall amplifier 4 via a voltage conversion circuit 7 and a gain setting amplifier 18. The voltage gain of the hall amplifier 4 is set by the gain setting voltage V4 applied to the power connection terminal.

In detail, in this embodiment, the power supply voltage V1 is converted by the voltage conversion circuit 7 into a converted voltage V3 corresponding to the power supply voltage V1 and inputted into the gain setting amplifier 18. Also inputted into the gain setting amplifier 18 is the amplified detection signal S3. The gain setting amplifier 18 compares the converted voltage V3 and the amplified detection signal S3 and outputs the gain setting voltage V4. The gain setting voltage V4 is inputted into the power connection terminal 10 of the hall amplifier 4 to change the voltage gain of the hall amplifier 4.

Thus, in this embodiment, in accordance with the set power supply voltage V1, the voltage gain of the hall amplifier 4 is changed. As a result the amplification of the amplified detection signal S3 changes in accordance with the increase/decrease of the power supply voltage V1, which in turn changes the amplitude of the driving signal S1 In this embodiment too, it is preferable that the driving signal S1 changes so that the ratio of the saturation time of the driving signal S1 and the non-saturation time thereof kept constant. In this case too, the balance between the noise generation and the heat generation depending on each power supply voltage V1 can be kept optimum.

Although the aforementioned embodiments are directed to a single-phase brushless motor, the present invention can also be applied to another motors, such as, e.g., a two-phase brushless motor or a three-phase brushless motor.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A motor driving circuit, comprising:
   a phase detection circuit configured to detect a rotation phase of a motor and output a phase detection signal;
   a first amplifier configured to amplify the phase detection signal and output an amplified detection signal;
   a second amplifier configured to amplify the amplified detection signal in accordance with a power supply voltage and output a driving signal to the motor; and
   a controlling circuit configured to detect the power supply voltage and adjust amplitude of the amplified detection signal to be outputted from the first amplifier in response to changes of the detected power supply voltage so that a waveform of the driving signal is kept saturated irrespective of the changes of the detected power supply voltage.

2. The motor driving circuit as recited in claim 1, wherein the controlling circuit is configured to adjust the amplitude of the amplified detection signal so that an apex of a waveform of the driving signal is saturated by the power supply voltage at a predetermined constant rate, irrespective of the changes of the detected power supply voltage.

3. The motor driving circuit as recited in claim 1, wherein the controlling circuit is configured to adjust the amplitude of the driving signal so as to keep a ratio of a saturation time of the driving signal and a non-saturation time of the driving signal constant or approximately constant, irrespective of the changes of the detected power supply voltage, and
wherein the saturation time and the non-saturation time are defined, respectively, as a saturation time of an apex of a waveform of the driving signal and a non-saturation time thereof in a case where a balance of heat generation and noise generation due to saturation of the apex of the waveform of the driving signal is set to optimum.

4. The motor driving circuit as recited in claim 1, wherein the controlling circuit is configured so that the detection circuit changes amplitude of the detection signal in accordance with the changes of the detected power supply voltage.

5. The motor driving circuit as recited in claim 1, wherein the controlling circuit is configured to change a gain of the first amplifier in accordance with the changes of the detected power supply voltage.

6. The motor driving circuit as recited in claim 1, wherein the controlling circuit comprises a voltage conversion circuit which converts the power supply voltage into a converted voltage, and a third amplifier in which the converted voltage is inputted as one of inputs and the amplified detection signal is inputted as the other input,
wherein the detection circuit is provided with a hall element, and
wherein an output of the third amplifier is inputted into the hall element as a hall bias, whereby the detection signal of the detection circuit is adjusted in accordance with the changes of the detected power supply voltage.

7. The motor driving circuit as recited in claim 1,
wherein the controlling circuit comprises a voltage conversion circuit which converts the power supply voltage into a converted voltage, and a third amplifier in which the converted voltage is inputted as one of inputs and the amplified detection signal is inputted as the other input, and
wherein an output of the third amplifier is inputted to a power connection terminal of the first amplifier, whereby a gain of the first amplifier is adjusted in accordance with the changes of the detected power supply voltage.

8. The motor driving circuit as recited in claim 1, further comprising a speed controlling circuit for controlling a revolving speed of the motor by adjusting the power supply voltage.

9. The motor driving circuit as recited in claim 1, wherein the detection circuit is provided with a hall element, and further comprising a hall current circuit for adjusting a hall current passing through the hall element so as not to exceed a predetermined value.

\* \* \* \* \*